United States Patent
Masuda et al.

(10) Patent No.: US 10,023,720 B2
(45) Date of Patent: Jul. 17, 2018

(54) FILLER POWDER AND METHOD FOR MANUFACTURING SAME

(71) Applicant: NIPPON ELECTRIC GLASS CO., LTD., Otsu-shi, Shiga (JP)

(72) Inventors: Noriaki Masuda, Otsu (JP); Yohei Hosoda, Otsu (JP); Shingo Nakane, Otsu (JP); Hiroki Yamazaki, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 272 days.

(21) Appl. No.: 14/889,239

(22) PCT Filed: May 19, 2014

(86) PCT No.: PCT/JP2014/063176
§ 371 (c)(1),
(2) Date: Nov. 5, 2015

(87) PCT Pub. No.: WO2014/188991
PCT Pub. Date: Nov. 27, 2014

(65) Prior Publication Data
US 2016/0083557 A1    Mar. 24, 2016

(30) Foreign Application Priority Data

May 23, 2013   (JP) .................. 2013-108545
Nov. 27, 2013  (JP) .................. 2013-244928
Apr. 1, 2014   (JP) .................. 2014-075122
May 9, 2014    (JP) .................. 2014-097358

(51) Int. Cl.
| | | |
|---|---|---|
| *C08K 3/40* | (2006.01) | |
| *C08K 7/20* | (2006.01) | |
| *C03C 3/078* | (2006.01) | |
| *C03C 3/083* | (2006.01) | |
| *C03C 3/085* | (2006.01) | |
| *C03C 3/097* | (2006.01) | |
| *C03C 4/00* | (2006.01) | |
| *C03C 10/00* | (2006.01) | |
| *C03C 12/00* | (2006.01) | |
| *C03C 3/06* | (2006.01) | |
| *C03C 8/24* | (2006.01) | |
| *C09C 1/28* | (2006.01) | |

(52) U.S. Cl.
CPC ................ *C08K 3/40* (2013.01); *C03C 3/06* (2013.01); *C03C 3/085* (2013.01); *C03C 3/097* (2013.01); *C03C 8/24* (2013.01); *C03C 10/0009* (2013.01); *C03C 10/0027* (2013.01); *C08K 7/20* (2013.01); *C09C 1/28* (2013.01); *C01P 2004/32* (2013.01); *C01P 2004/61* (2013.01); *C01P 2004/62* (2013.01); *C01P 2004/64* (2013.01); *C01P 2004/80* (2013.01); *C01P 2006/12* (2013.01); *C01P 2006/22* (2013.01); *C01P 2006/32* (2013.01); *C01P 2006/60* (2013.01); *C03C 2201/02* (2013.01); *C03C 2203/10* (2013.01)

(58) Field of Classification Search
None
See application file for complete search history.

(56) References Cited

U.S. PATENT DOCUMENTS

| | | | |
|---|---|---|---|
| 4,627,160 A | 12/1986 | Herron et al. | |
| 2006/0135341 A1* | 6/2006 | Ellison | C03C 10/0027 501/4 |

FOREIGN PATENT DOCUMENTS

| | | | | |
|---|---|---|---|---|
| JP | 62-30638 A | 2/1987 | | |
| JP | 04-285028 A | 10/1992 | | |
| JP | 04-285029 A | 10/1992 | | |
| JP | 2005-289790 A | 10/2005 | | |
| JP | 2006-206421 A | 8/2006 | | |
| JP | 2007-091577 A | 4/2007 | | |
| JP | 2008-260669 A | * 10/2008 | ............ | C03C 10/12 |
| JP | 2009-088303 A | 4/2009 | | |
| JP | 2010-116315 A | 5/2010 | | |

OTHER PUBLICATIONS

Machine translation of JP 2008-260669 A (no date).*
Official Communication issued in International Patent Application No. PCT/JP2014/063176, dated Aug. 19, 2014.

* cited by examiner

*Primary Examiner* — Michael J Feely
(74) *Attorney, Agent, or Firm* — Keating and Bennett, LLP

(57) ABSTRACT

Provided is a filler powder that has a lower coefficient of thermal expansion than silica powder and is less likely to cause quality and color alteration of a resin when blended into the resin. The filler powder is made of a crystallized glass in which β-quartz solid solution and/or β-eucryptite is precipitated. The filler powder preferably has an average particle size $D_{50}$ of 5 μm or less. The filler powder preferably has a coefficient of thermal expansion of $5\times10^{-7}/°$ C. or less in a range of 30 to 150° C.

14 Claims, 2 Drawing Sheets

FILLER POWDER AND METHOD FOR MANUFACTURING SAME

TECHNICAL FIELD

The present invention relates to a filler powder suitable to be blended into a resin for use in multi-layer printed circuit boards and so on and a method for manufacturing the same.

BACKGROUND ART

Conventionally, blending an inorganic filler powder into a resin has been performed for the purpose of controlling the coefficient of thermal expansion or other purposes. For example, in a multi-layer printed circuit board in which a resin is used, the coefficient of thermal expansion of an insulating layer needs to be decreased because a difference in coefficient of thermal expansion between a conductor layer and the insulating layer promotes the occurrence of cracks. For this reason, an inorganic filler powder, such as silica powder, is blended into a resin. Silica powder is widely used as an inorganic filler powder because it is excellent in physical strength and thermal resistance (see, for example, Patent Literature 1).

CITATION LIST

Patent Literature

[PTL 1]
JP-A-2009-88303

SUMMARY OF INVENTION

Technical Problem

In recent years there has been a demand for further reduction in thermal expansion of resin compositions. Silica powder has a low coefficient of thermal expansion to some degree, but it is still insufficient to have the effect of decreasing the coefficient of thermal expansion of the resin composition. Therefore, even if silica powder is blended into the resin, a desired low coefficient of thermal expansion is difficult to achieve. Alternatively, if in order to achieve a desired low coefficient of thermal expansion a large amount of silica powder is blended in the resin, the homogeneity tends to decrease and the resin when formed into a film tends to be poor in surface smoothness.

It is conceivable to use a filler powder made of β-eucryptite crystal, β-quartz solid solution crystal or the like exhibiting a lower expansion property than silica powder. However, the filler powder may react with the resin composition to alter the quality or color of the resin composition. Furthermore, because these types of filler powder basically have a crushed shape, they have difficulty reducing the specific surface area, so that when added to a resin, the viscosity is likely to increase.

In view of the above, the present invention has an object of providing a filler powder that has a lower coefficient of thermal expansion than silica powder and, when blended into a resin, is less likely to alter the quality and color of the resin.

Furthermore, the present invention also has an object of providing a method that can easily manufacture a filler powder containing β-eucryptite crystals and/or β-quartz solid solution crystals and having a small specific surface area.

Solution to Problem

A filler powder of the present invention is made of a crystallized glass in which β-quartz solid solution and/or β-eucryptite is precipitated.

The filler powder of the present invention preferably has an average particle size $D_{50}$ of 5 μm or less.

The filler powder of the present invention preferably has a coefficient of thermal expansion of $5\times10^{-7}$/° C. or less in a range of 30 to 150° C.

The filler powder of the present invention is preferably made of a crystallized glass containing, in % by mass, 55 to 75% $SiO_2$, 15 to 30% $Al_2O_3$, 2 to 10% $Li_2O$, 0 to 3% $Na_2O$, 0 to 3% $K_2O$, 0 to 5% $MgO$, 0 to 10% $ZnO$, 0 to 5% $BaO$, 0 to 5% $TiO_2$, 0 to 4% $ZrO_2$, 0 to 5% $P_2O_5$, and 0 to 2.5% $SnO_2$.

The filler powder of the present invention preferably has an approximately spherical shape or an approximately columnar shape.

The filler powder of the present invention is preferably used to be blended into a resin.

A resin composition of the present invention contains the above-described filler powder and a resin.

A method for manufacturing a filler powder of the present invention includes the step of heating a crystallizable glass powder at a crystallization onset temperature or higher to precipitate β-quartz solid solution and/or β-eucryptite, wherein a rate of temperature rise from below the crystallization onset temperature to the crystallization onset temperature or higher is not less than 25° C./min.

The inventors considered the use of a crystallized glass containing crystals of β-quartz solid solution and/or β-eucryptite as a filler powder containing β-quartz solid solution and/or β-eucryptite. However, when in producing the crystallized glass a glass powder having the characteristic of precipitating β-quartz solid solution and/or β-eucryptite is heated, crystal precipitation tends to be almost completed before the glass powder softens and deforms, which makes it difficult to obtain a filler powder having a small specific surface area. The inventors have conducted intensive studies to solve the above problem, resulting in the finding that when the rate of temperature rise of a crystallizable glass powder from below its crystallization onset temperature to its crystallization onset temperature or higher is increased as described above, crystals precipitate after or while the crystallized glass powder softens and deforms, so that a filler powder having a small specific surface area can be obtained owing to the surface tension.

In the method for manufacturing a filler powder of the present invention, it is preferred that after the step of holding the crystallizable glass powder below the crystallization onset temperature for a predetermined period of time to form crystal nuclei, the crystallizable glass powder be heated to the crystallization onset temperature or higher.

By doing so, a filler powder can be easily obtained in which fine crystals are homogeneously precipitated and which has a desired thermal expansion property.

The method for manufacturing a filler powder of the present invention preferably further includes the step of holding the crystallizable glass powder at the crystallization onset temperature or higher for a predetermined period of time to grow crystals.

By doing so, a filler powder can be easily obtained which has an increased amount of precipitated crystals and a desired thermal expansion property.

In the method for manufacturing a filler powder of the present invention, the filler powder preferably has an average particle size $D_{50}$ of 5 µm or less.

In the method for manufacturing a filler powder of the present invention, the filler powder preferably has a specific surface area of 20 m$^2$/g or less.

In the method for manufacturing a filler powder of the present invention, the filler powder preferably has an approximately spherical shape.

In the method for manufacturing a filler powder of the present invention, the filler powder preferably has a coefficient of thermal expansion of $5 \times 10^{-7}$/° C. or less in a range of 30 to 150° C.

In the method for manufacturing a filler powder of the present invention, the filler powder preferably contains, in % by mass, 55 to 75% $SiO_2$, 15 to 30% $Al_2O_3$, 2 to 10% $Li_2O$, 0 to 3% $Na_2O$, 0 to 3% $K_2O$, 0 to 5% $MgO$, 0 to 10% $ZnO$, 0 to 5% $BaO$, 0 to 5% $TiO_2$, 0 to 4% $ZrO_2$, 0 to 5% $P_2O_5$, and 0 to 2.5% $SnO_2$.

Advantageous Effects of Invention

The present invention can provide a filler powder that has a lower coefficient of thermal expansion than silica powder and, when blended into a resin, is less likely to alter the quality and color of the resin.

The manufacturing method of the present invention can provide a manufacturing method capable of easily manufacturing a filler powder which is made of a crystallized glass containing β-eucryptite crystals and/or β-quartz solid solution crystals and has a small specific surface area.

DESCRIPTION OF EMBODIMENTS

Figure 1:
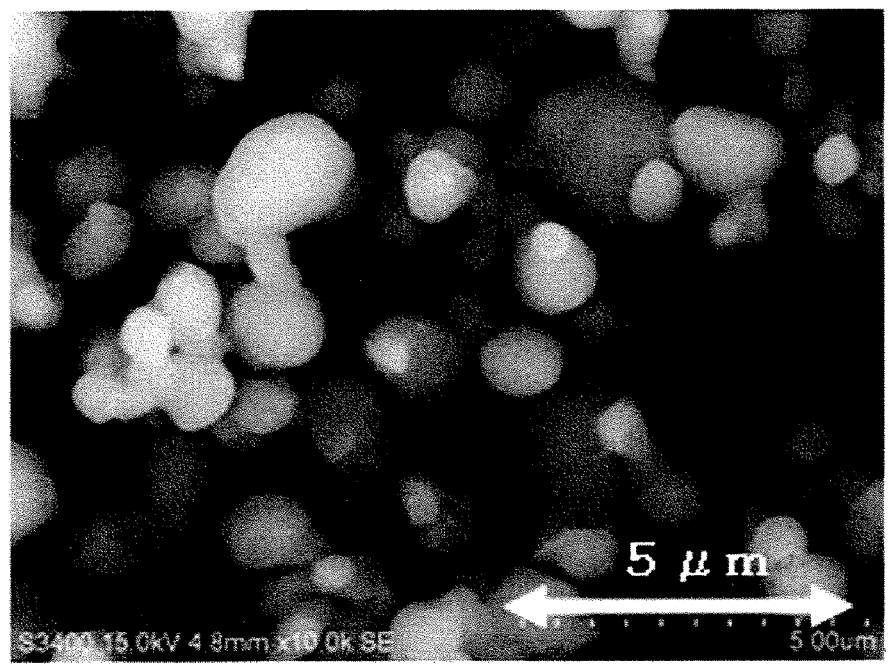
FIG. 1 is a photograph of a filler powder obtained in Example 3, as observed with a SEM (scanning electron microscope).

A filler powder of the present invention is made of a crystallized glass in which β-quartz solid solution ($Li_2O \cdot Al_2O_3 \cdot nSiO_2$; 2<n) and/or β-eucryptite ($Li_2O \cdot Al_2O_3 \cdot 2SiO_2$) is precipitated therein and has a lower thermal expansion property as compared to silica powder commonly used in the past as an inorganic filler powder. Thus, in blending the filler powder into a resin, it is possible to achieve a desired thermal expansion property in a relatively small amount.

Furthermore, unlike crystal powders of β-quartz solid solution and β-eucryptite, the filler powder of the present invention is made of a crystallized glass and therefore has low reactivity with resin. Hence, the filler powder of the present invention has the feature that when blended into a resin, it is less likely to cause the resin to alter its quality, color, and so on.

Moreover, the filler powder of the present invention has a relatively small crystallite size of precipitated crystals and can be therefore easily finely ground. By blending a finely ground filler powder of small particle diameter into a resin, a resin formed body can be reduced in thickness. If a finely ground crystal powder is blended as a filler powder into a resin, the resultant resin formed body tends to have a large coefficient of thermal expansion as compared to a resin formed body wherein a coarsely ground filler powder is used. In contrast, unlike the crystal powder, the filler powder of the present invention has the feature that even when finely ground, the effect of decreasing the coefficient of thermal expansion is less likely to be impaired.

The average particle size $D_{50}$ of the filler powder of the present invention is preferably 5 µm or less, more preferably 3 µm or less, and still more preferably 1 µm or less. The maximum particle size $D_{99}$ of the filler powder of the present invention is preferably 30 µm or less, more preferably 25 µm or less, and still more preferably 20 µm or less. If the average particle size $D_{50}$ or the maximum particle size $D_{99}$ of the filler powder is too large, this provides, when the filler powder is blended into a resin and the resin is formed into a film, the tendency to cause a significant exposure of the filler powder on the film surface to degrade the surface smoothness. Although no particular limitation is placed on the lower limit of the average particle size $D_{50}$ of the filler powder, it is practically 0.1 µm or more and preferably 0.2 µm or more.

When a resin formed body in which the filler powder of the present invention is used has a large thickness, the average particle size $D_{50}$ and the maximum particle size $D_{99}$ of the filler powder are not limited to the above ranges. For example, use may be made of a filler powder having an average particle size $D_{50}$ of 50 µm or less and particularly 20 µm or less or a filler powder having a maximum particle size $D_{99}$ of 100 µm or less and particularly 50 µm or less.

The average particle size $D_{50}$ and the maximum particle size $D_{99}$ in the present invention refers to the values measured by laser diffractometry.

The amount of β-quartz solid solution or β-eucryptite precipitated in the filler powder of the present invention is preferably 50% by mass or more and more preferably 70% by mass or more. If the amount of β-quartz solid solution or β-eucryptite precipitated is too small, the effect of decreasing the coefficient of thermal expansion is difficult to achieve. On the other hand, no particular limitation is placed on the upper limit of the amount of β-quartz solid solution or β-eucryptite precipitated, but it is practically 99% by mass or less. If the filler powder contains both β-quartz solid solution and β-eucryptite, the total amount of them preferably meets the above range.

The coefficient of thermal expansion of the filler powder of the present invention in a range of 30 to 150° C. is preferably $5 \times 10^{-7}$/° C. or less, more preferably $3 \times 10^{-7}$/° C. or less, and still more preferably $2 \times 10^{-7}$° C. or less. Note that although no particular limitation is placed on the lower limit of the coefficient of thermal expansion, it is practically $-30 \times 10^{-7}/°$ C. or more and particularly $-25 \times 10^{-7}/°$ C. or more.

No particular limitation is placed on the type of the filler powder of the present invention so long as it can precipitate β-quartz solid solution and/or β-eucryptite. For example, the filler powder of the present invention is preferably made of a crystallized glass containing, in % by mass, 55 to 75% $SiO_2$, 15 to 30% $Al_2O_3$, 2 to 10% $Li_2O$, 0 to 3% $Na_2O$, 0 to 3% $K_2O$, 0 to 5% MgO, 0 to 10% ZnO, 0 to 5% BaO, 0 to 5% $TiO_2$, 0 to 4% $ZrO_2$, 0 to 5% $P_2O_5$, and 0 to 2.5% $SnO_2$. The reasons why the glass composition range is restricted as above are described below.

$SiO_2$ is a component for forming the glass network and becomes a constituent of the main crystal. The $SiO_2$ content is preferably 55 to 75% and more preferably 60 to 75%. If the $SiO_2$ content is too small, the coefficient of thermal expansion tends to increase and the chemical durability tends to decrease. On the other hand, if the $SiO_2$ content is too large, the meltability tends to decrease and the viscosity of glass melt tends to increase, which makes it difficult to fine the glass and makes it difficult to form the glass melt into shape.

$Al_2O_3$ is a component for forming the glass network and becomes a constituent of the main crystal. The $Al_2O_3$ content is preferably 15 to 30% and more preferably 17 to 27%. If the $Al_2O_3$ content is too small, the coefficient of thermal expansion tends to increase and the chemical durability tends to decrease. On the other hand, if the $Al_2O_3$ content is too large, the meltability tends to decrease. Furthermore, the viscosity tends to increase, which makes it difficult to fine the glass and makes it difficult to form the glass melt into shape. In addition, the glass is likely to devitrify.

$Li_2O$ is a constituent of the main crystal and a component that has a significant effect on the crystallinity and decreases the viscosity to improve the meltability and the formability. The $Li_2O$ content is preferably 2 to 10%, more preferably 2 to 7%, still preferably 2 to 5%, and particularly preferably 2 to 4.8%. If the $Li_2O$ content is too small, main crystals become difficult to precipitate and the meltability decreases. Furthermore, the viscosity tends to increase, which makes it difficult to fine the glass and makes it difficult to form the glass melt into shape. On the other hand, if the $Li_2O$ content is too large, the glass is likely to devitrify.

$Na_2O$ and $K_2O$ are components for decreasing the viscosity to improve the meltability and the formability. Each of the $Na_2O$ content and $K_2O$ content is preferably 0 to 3% and more preferably 0.1 to 1%. If the $Na_2O$ content or $K_2O$ content is too large, the glass is likely to devitrify and the coefficient of thermal expansion is likely to increase. Furthermore, when the filler powder is blended into a resin, the resin may alter the quality.

MgO is a component for controlling the coefficient of thermal expansion. The MgO content is preferably 0 to 5%, more preferably 0.1 to 3%, and still more preferably 0.3 to 2%. If the MgO content is too large, the glass is likely to devitrify and the coefficient of thermal expansion is likely to increase.

ZnO is a component for controlling the coefficient of thermal expansion. The ZnO content is preferably 0 to 10%, more preferably 0 to 7%, still more preferably 0 to 3%, and particularly preferably 0.1 to 1%. If the ZnO content is too large, the glass is likely to devitrify.

BaO is a component for decreasing the viscosity to improve the meltability and the formability. The BaO content is preferably 0 to 5% and more preferably 0.1 to 3%. If the BaO content is too large, the glass is likely to devitrify.

$TiO_2$ and $ZrO_2$ are components that act as a nucleating agent for precipitating crystals in the crystallization process. The $TiO_2$ content is preferably 0 to 5% and more preferably 1 to 4%. The $ZrO_2$ content is preferably 0 to 4% and more preferably 0.1 to 3%. If the $TiO_2$ content or $ZrO_2$ content is too large, the glass is likely to devitrify.

$P_2O_5$ is a component for promoting phase separation to assist in forming crystal nuclei. The $P_2O_5$ content is preferably 0 to 5% and more preferably 0.1 to 4%. If the $P_2O_5$ content is too large, the glass is likely to cause phase separation in the melting process, so that the resultant glass is likely to become cloudy.

$SnO_2$ is a component acting as a fining agent. The $SnO_2$ content is preferably 0 to 2.5% and more preferably 0.1 to 2%. If the $SnO_2$ content is too large, the glass is likely to have an excessively dark tone and devitrify.

In addition to the above components, $B_2O_3$, SrO, CaO, and so on may be appropriately incorporated into the filler powder within a range of not impairing the effects of the present invention.

The specific surface area of the filler powder of the present invention is preferably 20 $m^2/g$ or less, more preferably 18 $m^2/g$ or less, still more preferably 15 $m^2/g$ or less, and particularly preferably 10 $m^2/g$ or less. If the specific surface area is too large, the filler powder becomes difficult to disperse into a resin and becomes difficult to be blended at high concentration into the resin.

Although no particular limitation is placed on the shape of the filler powder of the present invention, it is preferably approximately spherical, approximately columnar or prismoidal. By doing so, even if the average particle shape of the filler powder is small, the specific surface area becomes small, which is favorable. Furthermore, in this case, it becomes possible to blend the filler powder at high concentration into a resin. In the case where the shape is approximately spherical, the above effects can be more easily achieved as the shape is closer to a perfect sphere. In the case where the shape is approximately columnar or prismoidal, the aspect ratio is preferably 10 or less because the above effects can be easily achieved and the resultant resin formed body can be increased in mechanical strength.

The filler powder of the present invention may be subjected to surface treatment with a silane coupling agent in order to increase the wettability at the interface with a resin and increase the dispersibility when blended into the resin. Examples that can be cited as the silane coupling agent include amino silane, epoxy silane, methacryl silane, ureido silane, and isocyanate silane.

The filler powder of the present invention is manufactured in the following manner. First, a raw material batch obtained by formulating glass raw materials in a predetermined proportion is melted to obtain molten glass. Next, the molten glass is formed into a predetermined shape (for example, platy shape) to obtain a bulk crystallizable glass. Then, the bulk crystallizable glass is subjected to heat treatment under predetermined conditions to precipitate therein β-quartz solid solution and/or β-eucryptite, resulting in a bulk crystallized glass. The resultant bulk crystallized glass is subjected to a predetermined grinding process, so that a filler powder of the present invention can be obtained. This method can easily provide a filler powder having a high crystallinity.

From the viewpoint of productivity and homogeneity, the melting temperature of the raw material batch is preferably about 1600 to about 1800° C. Furthermore, as the heat treatment conditions (crystallization conditions) for the crystallizable glass, it is preferred to subject the crystallizable glass to heat treatment at 600 to 800° C. for 1 to 5 hours to form crystal nuclei (crystal nuclei formation stage) and then further subject it to heat treatment at 800 to 950° C. for 0.5 to 3 hours to precipitate main crystals (crystal growth stage).

The filler powder of the present invention may also be manufactured by grinding a bulk crystallizable glass obtained by forming molten glass to produce a crystallizable glass powder and then subjecting the crystallizable glass powder to heat treatment to crystallize it. In this case, by subjecting the crystallizable glass powder to heat treatment by spraying it in a flame before crystallizing it, the surface of the crystallizable glass powder softens and fluidizes, so that an approximately spherical filler powder can be obtained. Alternatively, by spinning the molten glass into fibers, then grinding the fibers, and subjecting the fibers to heat treatment, an approximately columnar filler powder can be obtained.

The filler powder of the present invention is used, for example, to be blended into a resin. A resin formed body obtained by blending the filler powder of the present invention into a resin is used as a multi-layer printed circuit board or so on. No particular limitation is placed on the type of the resin so long as it is commonly used. Examples that can be cited include thermosetting resins, such as epoxy resin, polyester resin, phenolic resin, urethane resin, and amino resin, and thermoplastic resins, such as polyvinyl resin, polyamide resin, polyimide resin, allyl resin, styrene resin, acrylic resin, and polycarbonate resin.

The content of the filler powder in the resin is appropriately selected according to desired properties, such as a coefficient of thermal expansion. For example, the content of the filler powder relative to the total amount of the resin and the filler powder can be appropriately selected preferably in a range of 10 to 95% by volume and more preferably in a range of 20 to 90% by volume.

A resin composition of the present invention is characterized by containing a resin and the above filler powder. By doing so, the coefficient of thermal expansion of a resin formed body formed from the resin composition can be decreased.

A method for manufacturing a filler powder of the present invention is characterized by including the step of heating a crystallizable glass powder at a crystallization onset temperature or higher to precipitate β-quartz solid solution and/or β-eucryptite, wherein a rate of temperature rise from below the crystallization onset temperature to the crystallization onset temperature or higher is 25° C./min or more. Each of the constituent features of the invention will be described below in detail.

(Crystallizable Glass Powder)

No particular limitation is placed on the type of the crystallizable glass powder so long as it can precipitate β-quartz solid solution and/or β-eucryptite. For example, the crystallizable glass powder preferably contains, in % by mass, 55 to 75% $SiO_2$, 15 to 30% $Al_2O_3$, 2 to 10% $Li_2O$, 0 to 3% $Na_2O$, 0 to 3% $K_2O$, 0 to 5% MgO, 0 to 10% ZnO, 0 to 5% BaO, 0 to 5% $TiO_2$, 0 to 4% $ZrO_2$, 0 to 5% $P_2O_5$, and 0 to 2.5% $SnO_2$. The reasons why the glass composition range is restricted as above are described below.

$SiO_2$ is a component for forming the glass network and becomes a constituent of the main crystal. The $SiO_2$ content is preferably 55 to 75% and more preferably 60 to 75%. If the $SiO_2$ content is too small, the coefficient of thermal expansion tends to increase and the chemical durability tends to decrease. On the other hand, if the $SiO_2$ content is too large, the meltability is likely to decrease. Furthermore, the viscosity of the molten glass tends to increase, which makes it difficult to fine the glass and makes it difficult to form the molten glass into shape.

$Al_2O_3$ is a component for forming the glass network and becomes a constituent of the main crystal. The $Al_2O_3$ content is preferably 15 to 30% and more preferably 17 to 27%. If the $Al_2O_3$ content is too small, the coefficient of thermal expansion tends to increase and the chemical durability tends to decrease. On the other hand, if the $Al_2O_3$ content is too large, the meltability tends to decrease. Furthermore, the viscosity of the molten glass tends to increase, which makes it difficult to fine the glass and makes it difficult to form the molten glass into shape. In addition, the glass is likely to devitrify.

$Li_2O$ is a constituent of the main crystal and a component that has a significant effect on the crystallinity and decreases the viscosity to improve the meltability and the formability. The $Li_2O$ content is preferably 2 to 10%, more preferably 2 to 7%, still preferably 2 to 5%, and particularly preferably 2 to 4.8%. If the $Li_2O$ content is too small, main crystals become difficult to precipitate and the meltability is likely to decrease. Furthermore, the viscosity tends to increase, which makes it difficult to fine the glass and makes it difficult to form the molten glass into shape. On the other hand, if the $Li_2O$ content is too large, the glass is likely to devitrify.

$Na_2O$ and $K_2O$ are components for decreasing the viscosity to improve the meltability and the formability. Each of the $Na_2O$ content and $K_2O$ content is preferably 0 to 3% and more preferably 0.1 to 1%. If the $Na_2O$ content or $K_2O$ content is too large, the glass is likely to devitrify and the coefficient of thermal expansion is likely to increase. Furthermore, when the filler powder is blended into a resin, the resin may alter the quality.

MgO is a component for controlling the coefficient of thermal expansion. The MgO content is preferably 0 to 5%, more preferably 0.1 to 3%, and still more preferably 0.3 to 2%. If the MgO content is too large, the glass is likely to devitrify and the coefficient of thermal expansion is likely to increase.

ZnO is a component for controlling the coefficient of thermal expansion. The ZnO content is preferably 0 to 10%, more preferably 0 to 7%, still more preferably 0 to 3%, and particularly preferably 0.1 to 1%. If the ZnO content is too large, the glass is likely to devitrify.

BaO is a component for decreasing the viscosity to improve the meltability and the formability. The BaO content is preferably 0 to 5% and more preferably 0.1 to 3%. If the BaO content is too large, the glass is likely to devitrify.

$TiO_2$ and $ZrO_2$ are components that act as a nucleating agent for precipitating crystals in the crystallization process. The $TiO_2$ content is preferably 0 to 5% and more preferably 1 to 4%. The $ZrO_2$ content is preferably 0 to 4% and more preferably 0.1 to 3%. If the $TiO_2$ content or ZrO content is too large, the glass is likely to devitrify.

$P_2O_5$ is a component for promoting phase separation to assist in forming crystal nuclei. The $P_2O_5$ content is preferably 0 to 5% and more preferably 0.1 to 4%. If the $P_2O_5$ content is too large, the glass is likely to cause phase separation in the melting process, so that the resultant glass is likely to become cloudy.

$SnO_2$ is a component acting as a fining agent. The $SnO_2$ content is preferably 0 to 2.5% and more preferably 0.1 to 2%. If the $SnO_2$ content is too large, the glass is likely to have an excessively dark tone and devitrify.

In addition to the above components, $B_2O_3$, SrO, CaO, and so on may be appropriately incorporated into the filler powder within a range of not impairing the effects of the present invention.

The average particle size $D_{50}$ of the crystallizable glass powder is preferably 5 µm or less, more preferably 3 µm or less, and still more preferably 1 µm or less. Furthermore, the maximum particle size $D_{99}$ of the crystallizable glass powder is preferably 30 µm or less, more preferably 25 µm or less, and still more preferably 20 µm or less. If the average particle size $D_{50}$ or the maximum particle size $D_{99}$ of the crystallizable glass powder is too large, the crystallizable glass powder is less likely to change to a desired shape when subjected to heat treatment, so that a filler powder having a sufficiently large specific surface area is difficult to obtain. Furthermore, in blending the obtained filler powder into a resin and forming the resin into a film, the exposure of the filler powder on the film surface becomes significant, so that the resin tends to degrade the surface smoothness. Although no particular limitation is placed on the lower limit of the average particle size $D_{50}$ of the crystallizable glass powder, it is practically 0.1 µm or more and preferably 0.2 µm or more.

The average particle size $D_{50}$ and the maximum particle size $D_{99}$ in the present invention refers to the values measured by laser diffractometry.

The crystallizable glass powder can be manufactured in the following manner. First, a raw material batch obtained by formulating raw material powders in a predetermined proportion is melted to obtain molten glass. From the viewpoint of productivity and homogeneity, the melting temperature is preferably about 1600 to about 1800° C. Next, the molten glass is formed into a film to obtain a bulk crystallizable glass. The obtained bulk crystallized glass is subjected to a predetermined grinding process to obtain a crystallizable glass powder. In order to reduce the aggregation of crystallized glass powder particles during the grinding process, alumina powder or the like may be added to the crystallizable glass powder.

(Crystal Precipitation Step)

By heating the crystallizable glass powder obtained as above at its crystallization onset temperature or higher, β-quartz solid solution and/or β-eucryptite can be precipitated to obtain a filler powder. In doing so, the rate of temperature rise from below the crystallization onset temperature to the crystallization onset temperature or higher is 25° C./min or more, preferably 30° C./min or more, more preferably 35° C./min or more, and still more preferably 40° C./min or more. If the rate of temperature rise is too low, crystal precipitation tends to be almost completed before the crystallizable glass powder softens and deforms, so that a filler powder having a small specific surface area is difficult to obtain. In the case where the method includes a crystal nuclei formation step and a crystal growth step both of which will be described hereinafter, the rate of temperature rise from the crystal nuclei formation temperature to the crystal growth step may be defined as above.

In the process of heating the crystallized glass powder, alumina powder or the like may be added in order to reduce the aggregation of crystallizable glass powder particles.

Although the crystallization onset temperature varies depending upon the glass composition, the crystallization onset temperature of the crystallizable glass powder having the above composition range is about 700 to about 1050° C. and preferably about 750 to about 1000° C. The crystallization onset temperature can be measured by reading, in a chart obtained by DTA (differential thermal analysis), the onset temperature of a crystallization peak.

It is preferred that after the step of holding the crystallizable glass powder below the crystallization onset temperature for a predetermined period of time to form crystal nuclei (the crystal nuclei formation step), the crystallizable glass powder be heated to the crystallization onset temperature or higher. By doing so, a filler powder can be easily obtained in which fine crystals are homogeneously precipitated and which has a desired thermal expansion property. The crystal nuclei formation step is preferably appropriately adjusted under conditions of, for example, a range of 600 to 800° C. and a range of 1 to 5 hours.

Furthermore, it is preferred to raise the temperature of the crystallizable glass powder to the crystallization onset temperature or higher and then holding the crystallizable glass powder at the raised temperature for a predetermined period of time to grow crystals (the crystal growth step). By doing so, a filler powder can be easily obtained which has an increased amount of precipitated crystals and a desired thermal expansion property. The crystal growth step is preferably appropriately adjusted under conditions of, for example, a range of 800 to 950° C. and a range of 0.5 to 3 hours.

(Filler Powder)

Since the filler powder obtained by the above manufacturing method contains β-quartz solid solution and/or β-eucryptite having low expansion property, it has low thermal expansion property as compared to silica powder. Thus, in blending the filler powder into a resin, it is possible to achieve a desired thermal expansion property in a relatively small amount. Furthermore, unlike crystal powders of β-quartz solid solution and β-eucryptite, the manufacturing method of the present invention has the feature that by softening and deforming the crystallizable glass powder in the crystallization process, a filler powder having a small specific surface area can be obtained.

The amount of β-quartz solid solution or β-eucryptite precipitated in the filler powder is preferably 50% by mass or more and more preferably 70% by mass or more. If the amount of β-quartz solid solution or β-eucryptite precipitated is too small, the effect of decreasing the coefficient of thermal expansion is difficult to achieve. No particular limitation is placed on the upper limit of the amount of β-quartz solid solution or β-eucryptite precipitated, but it is practically 99% by mass or less. If the filler powder contains both β-quartz solid solution and β-eucryptite, the total amount of them preferably meets the above range.

The average particle size $D_{50}$ of the filler powder is preferably 5 µm or less, more preferably 3 µm or less, and still more preferably 1 µm or less. The maximum particle size $D_{99}$ of the filler powder is preferably 30 µm or less, more preferably 25 µm or less, and still more preferably 20 µm or less. If the average particle size $D_{50}$ or the maximum particle size $D_{99}$ of the filler powder is too large, this provides, when the filler powder is blended into a resin and the resin is formed into a film, the tendency to cause a significant exposure of the filler powder on the film surface to degrade the surface smoothness. Although no particular limitation is placed on the lower limit of the average particle size $D_{50}$ of the filler powder, it is practically 0.1 μm or more and preferably 0.2 μm or more.

The specific surface area of the filler powder is preferably 20 m$^2$/g or less, more preferably 18 m$^2$/g or less, still more preferably 15 m$^2$/g or less, and particularly preferably 10 m$^2$/g or less. If the specific surface area is too large, the increase in viscosity of the resin with the filler powder blended therein becomes significant, so that the blending at high concentration tends to be difficult.

The coefficient of thermal expansion of the filler powder in a range of 30 to 150° C. is preferably $5 \times 10^{-7}$/° C. or less, more preferably $3 \times 10^{-7}$/° C. or less, and still more preferably $2 \times 10^{-7}$/° C. or less. Note that although no particular limitation is placed on the lower limit of the coefficient of thermal expansion, it is practically $-30 \times 10^{-7}$/° C. or more and particularly $-25 \times 10^{-7}$/° C. or more.

Although no particular limitation is placed on the shape of the filler powder, it is preferably approximately spherical, approximately columnar, prismoidal or polyhedral. By doing so, even if the particle diameter of the filler powder is small, the specific surface area becomes small, which is favorable. Further, in this case, it becomes possible to blend the filler powder at high concentration into a resin. Among the above shapes, an approximately spherical shape, particularly a perfect sphere is favorable since the specific surface area of the filler powder becomes smaller.

The filler powder preferably contains, in % by mass, 55 to 75% $SiO_2$, 15 to 30% $Al_2O_3$, 2 to 10% $Li_2O$, 0 to 3% $Na_2O$, 0 to 3% $K_2O$, 0 to 5% MgO, 0 to 10% ZnO, 0 to 5% BaO, 0 to 5% $TiO_2$, 0 to 4% $ZrO_2$, 0 to 5% $P_2O_5$, and 0 to 2.5% $SnO_2$. In addition to the above components, $B_2O_3$, SrO, CaO, and so on may be appropriately incorporated into the filler powder within a range of not impairing the effects of the present invention. The reasons why the glass composition range is restricted as just described are the same as described in relation to the crystallizable glass powder and further description thereof will be therefore omitted.

The filler powder manufactured by the method of the present invention is, for example, blended into a resin and the resin is used as a multi-layer printed circuit board or so on. No particular limitation is placed on the type of the resin so long as it is commonly used. Examples that can be cited include thermosetting resins, such as epoxy resin, polyester resin, phenolic resin, urethane resin, and amino resin, and thermoplastic resins, such as polyvinyl resin, polyamide resin, polyimide resin, allyl resin, styrene resin, acrylic resin, and polycarbonate resin.

The content of the filler powder in the resin is appropriately selected according to desired properties, such as a coefficient of thermal expansion. For example, the content of the filler powder relative to the total amount of the resin and the filler powder can be appropriately selected preferably in a range of 10 to 95% by volume and more preferably in a range of 20 to 90% by volume.

EXAMPLES

Hereinafter, the present invention will be described with reference to examples, but is not limited to the examples.

<Examples of Filler Powder>

(1) Manufacture of Filler Powder

Raw material powders were formulated and uniformly mixed to provide glasses having their respective compositions described in Table 1. Each of the obtained raw material batches was melted at 1600 to 1800° C. until it became homogeneous. The molten glass was formed into a platy shape and cooled to room temperature using a annealing furnace, thereby obtaining a platy crystallizable glass.

In each of Examples A to H and O to Q, the platy crystallizable glass was subjected to heat treatment at 760 to 780° C. for three hours to form crystal nuclei and then further subjected to heat treatment at 870 to 890° C. for an hour to crystallize it. When the precipitated crystals were analyzed, it was confirmed that β-quartz solid solution precipitated as a main crystal. The resultant platy crystallized glasses were measured in terms of the coefficient of thermal expansion (CTE) in a temperature range of 30 to 150° C. with a dilatometer.

The resultant platy crystallized glasses were ground to obtain filler powders having their respective particle diameters shown in Tables 3, 4, and 7. In the grinding method, coarse grinding was performed so that the glass was dry ground for 24 hours with a ball mill and coarse powder was then removed with an air classifier. Fine grinding was performed so that the powder obtained by dry grinding for 24 hours was wet ground for 66 hours with a ball mill.

In each of Examples M and N, the crystallizable glass powder obtained by grinding the platy crystallizable glass was sprayed in a flame and thus spheroidized. Thereafter, 2 to 10% by weight fine alumina powder was added to the crystallizable glass powder and mixed together and the obtained mixture was subjected to heat treatment at 760 to 780° C. for three hours to form crystal nuclei and then further subjected to heat treatment at 870 to 890° C. for an hour. Thus, filler powders were obtained which have their respective particle diameters shown in Table 6.

(2) Evaluation

Each of the filler powders obtained as above was blended in a predetermined proportion described in Tables 3 to 7 into a resin described in Table 2. Furthermore, a curing agent was added to the mixture and the mixture was kneaded and then allowed to stand at 25° C. for 24 hours to be cured, resulting in a resin formed body in which the filler powder was dispersed. Note that in each of samples I to L which are Comparative Examples, a silica glass powder or a β-eucryptite crystal powder was used as a filler powder.

The resin formed bodies were measured in terms of the coefficient of thermal expansion in a temperature range of 30 to 150° C. with a TMA (Thermomechanical Analyzer). Furthermore, the color tone of each resin formed body was visually evaluated. The results are shown in Tables 3 to 7.

TABLE 1

| | | No. 1 | No. 2 | No. 3 | No. 4 | No. 5 |
|---|---|---|---|---|---|---|
| Glass Composition (% by mass) | $SiO_2$ | 66 | 66 | 67 | 62 | 61 |
| | $Al_2O_3$ | 23 | 22 | 23 | 27 | 26 |
| | MgO | 1 | — | — | — | — |
| | BaO | 1.5 | 1.5 | — | — | — |
| | ZnO | — | — | — | 2.3 | 4 |
| | $Li_2O$ | 4 | 4 | 4.8 | 5.4 | 6 |
| | $Na_2O$ | 0.5 | 0.5 | — | — | — |
| | $K_2O$ | — | 0.5 | — | — | — |
| | $TiO_2$ | 2 | 2 | — | — | — |
| | $ZrO_2$ | 2 | 2 | 2.4 | 2 | 2 |

TABLE 1-continued

|  | No. 1 | No. 2 | No. 3 | No. 4 | No. 5 |
|---|---|---|---|---|---|
| $P_2O_5$ | — | 1.3 | 1.4 | — | — |
| $SnO_2$ | — | 0.2 | 1.4 | 1.3 | 1 |
| CTE ($\times 10^{-7}$/° C.) | −1 | −11 | −20 | −22 | −23 |
| Crystal Size | approx. 30 nm | approx. 30 nm | approx. 30 nm | approx. 50 nm | approx. 50 nm |
| Refractive Index nd | 1.54 | 1.54 | 1.54 | 1.54 | 1.54 |

TABLE 2

|  | Epoxy Resin | Unsaturated Polyester Resin |
|---|---|---|
| Color Tone | clear colorless | clear colorless |
| CTE ($\times 10^{-7}$/° C.) | 1500 | 930 |
| Refractive Index nd | 1.55 | 1.60 |

TABLE 3

|  |  | Examples | | | |
|---|---|---|---|---|---|
|  |  | A | B | C | D |
| Resin |  | Epoxy | | Unsaturated Polyester | |
| Filler Powder | Type | No. 1 | No. 2 | No. 1 | No. 2 |
|  | Content [% by volume] | 40 | | | |
|  | Particle Shape | crushed | crushed | crushed | crushed |
|  | Particle Diameter [μm] | Fine Grinding | Fine Grinding | Coarse Grinding | Coarse Grinding |
|  | $D_{50}$ | 0.7 | 0.7 | 3.6 | 3.8 |
|  | $D_{99}$ | 1.6 | 1.6 | 19 | 17 |
|  | Specific Surface Area [cm²/g] | 16.1 | 17.2 | 3.5 | 3.6 |
|  | CTE α [$\times 10^{-7}$/° C.] | 890 | 840 | 550 | 535 |
|  | Color Tone | opal | opal | opal | opal |

TABLE 4

|  |  | Examples | | | |
|---|---|---|---|---|---|
|  |  | E | F | G | H |
| Resin |  | Epoxy | | | |
| Filler Powder | Type | No. 1 | | No. 2 | |
|  | Content [% by volume] | 50 | | | |
|  | Particle Shape | crushed | crushed | crushed | crushed |
|  | Particle Diameter [μm] | Coarse Grinding | Fine Grinding | Coarse Grinding | Fine Grinding |
|  | $D_{50}$ | 13.6 | 0.7 | 3.8 | 0.7 |
|  | $D_{99}$ | 19 | 1.6 | 17 | 1.6 |
|  | Specific Surface Area [cm²/g] | 3.5 | 16.1 | 3.6 | 17.2 |
|  | CTE α [$\times 10^{-7}$/° C.] | 710 | 715 | 695 | 690 |
|  | Δα((finely ground) − (coarsely ground)) [$\times 10^{-7}$/° C.] |  | +5 |  | −5 |
|  | Color Tone | opal | opal | opal | opal |

TABLE 5

|  |  | Comparative Examples | | | |
|---|---|---|---|---|---|
|  |  | I | J | K | L |
| Resin |  | Epoxy | | | |
| Filler Powder | Type | silica glass | | β-eucryptite | |
|  | CTE [$\times 10^{-7}$/° C.] | 5.7 | | −80 | |
|  | Crystal Size | — | | approx. 10 μm | |
|  | Refractive Index nd | 1.46 | | 1.52 | |
|  | Content [% by volume] | 50 | | | |
|  | Particle Diameter[μm] | Coarse Grinding | Fine Grinding | Coarse Grinding | Fine Grinding |
|  | $D_{50}$ | 2.8 | 0.7 | 6.8 | 1.1 |
|  | $D_{99}$ | 4.0 | 1.9 | 49 | 5.1 |
|  | CTE α [$\times 10^{-7}$/° C.] | 770 | 780 | 720 | 800 |
|  | Δα((finely ground) − (coarsely ground)) [$\times 10^{-7}$/° C.] |  | +10 |  | +80 |
|  | Color Tone | white | white | brown | brown |

TABLE 6

| | | Examples | |
|---|---|---|---|
| | | M | N |
| | Resin | Epoxy | |
| Filler Powder | Type | No. 2 | |
| | Content [% by volume] | 60 | |
| | Particle Shape | approx. spherical | approx. spherical |
| | Particle Diameter [μm] | Coarse Grinding | Fine Grinding |
| | $D_{50}$ | 1.7 | 0.7 |
| | $D_{99}$ | 6.0 | 1.4 |
| | Specific Surface Area [cm²/g] | 3.1 | 9.3 |
| CTE α [×10⁻⁷/° C.] | | 520 | 530 |
| Δα((finely ground) − (coarsely ground))[×10⁻⁷/° C.] | | | +10 |
| Color Tone | | opal | opal |

TABLE 7

| | | Examples | | |
|---|---|---|---|---|
| | | O | P | Q |
| | Resin | Epoxy | | |
| Filler Powder | Type | No. 3 | No. 4 | No. 5 |
| | Content [% by volume] | 50 | | |
| | Particle Shape | crushed | crushed | crushed |
| | Particle Diameter [μm] | Coarse Grinding | Coarse Grinding | Coarse Grinding |
| | $D_{50}$ | 4.8 | 4.6 | 4.9 |
| | $D_{99}$ | 28.6 | 27.5 | 29.1 |
| | Specific Surface Area [cm²/g] | 2.7 | 2.9 | 2.6 |
| CTE α [×10⁻⁷/° C.] | | 660 | 670 | 675 |
| Color Tone | | opal | opal | opal |

(3) Discussion of Results

In Examples E to H in which the filler content was 50% by volume, the coefficient of thermal expansion of the resin formed body was 690×10⁻⁷ to 715×10⁻⁷/° C. In Examples O to Q in which fillers of compositions Nos. 3 to 5 having a coefficient of thermal expansion of −20×10⁻⁷/° C. or less were used, the coefficient of thermal expansion of the resin formed body was smaller and 660×10⁻⁷ to 675×10⁻⁷/° C. On the other hand, in Comparative Examples I and J in which the filler content was likewise 50% by volume but silica glass was used as a filler powder, the coefficient of thermal expansion was 770×10⁻⁷ to 780×10⁻⁷/° C. Therefore, it can be seen from the above that the filler powder of the present invention has a profound decreasing effect on the coefficient of thermal expansion when blended into resin as compared to the filler powder made of silica glass.

In Examples M and N in which the filler content was 60% by volume, the coefficient of thermal expansion of the resin formed body was 520×10⁻⁷ to 530×10⁻⁷/° C. In these cases, since the particle shape is spherical, the specific surface area can be reduced to increase the filler content relative to the resin, so that the coefficient of thermal expansion of the resin formed body can be further reduced.

In Examples A to H and M to Q in which the filler powder of the present invention was used, the resin formed body had a desired opal color tone. Furthermore, since the difference of refractive indexes between the filler powder and the resin is smaller than that between silica glass and the resin, the resin formed body exhibited translucency. On the other hand, in Comparative Examples K and L in which β-eucryptite crystal powder was used as a filler powder, the color tone of the resin formed body was brown, that is, the resin altered the color. It can be seen from the above that when blended in a resin, the filler powder of the present invention can inhibit the color alteration of the resin.

In Examples E to H, M, and N, the difference in coefficient of thermal expansion between the resin formed bodies in which a finely ground filler powder was used and the resin formed bodies in which a coarsely ground filler powder was used was small (specifically, Δα((finely ground)−(coarsely ground)) was −5×10⁻⁷ to +10×10⁻⁷/° C.). On the other hand, in Comparative Examples K and L in which β-eucryptite crystal powder was used as a filler powder, the coefficient of thermal expansion of the resin formed body in which a finely ground filler powder was used was significantly increased as compared to that of the resin formed body in which a coarsely ground filler powder was used (specifically, Δα((finely ground)−(coarsely ground)) was +80×10⁻⁷/° C.). It can be seen from the above that the filler powder of the present invention is less likely to be impaired in the effect of decreasing the coefficient of thermal expansion even when finely ground. This can be attributed to the fact that the filler powder of the present invention has a very small crystal size.

<Examples of Method for Manufacturing Filler Powder>

(1) Production of Crystallizable Glass Powder

Raw material powders were formulated and uniformly mixed to give glass compositions described in Table 8. Each of the obtained raw material batches was melted at 1600 to 1800° C. until it became homogeneous. The molten glass was poured between a pair of rolls and formed into a film while being rapidly cooled, thereby obtaining a crystallizable glass.

The obtained film-like crystallizable glasses were ground in the methods described in Table 9, thereby obtaining crystallizable glass powders. In Table 9, "dry grinding" was performed by grinding the crystallizable glass for eight hours with a ball mill and the crystallizable glass powder obtained by grinding was classified with a metal sieve having an opening of 100 μm. "Wet grinding 1" was performed by grinding the crystallizable glass powder, which was obtained by dry grinding, for 40 hours with a ball mill. "Wet grinding 2" was performed by grinding the crystallizable glass powder, which was obtained by wet grinding 1, for 185 hours with a ball mill.

(2) Production of Filler Powder

Each of the crystallizable glass powders obtained as above was subjected to heat treatment at 760 to 780° C. for three hours to form crystal nuclei, then raised in temperature at the rate described in Table 9 to precipitate crystals, and further subjected to heat treatment at 870 to 890° C. for an hour to grow the crystals, thereby obtaining a filler powder. When the precipitated crystals were analyzed by XRD (X-ray diffraction), it was confirmed that β-quartz solid solution precipitated as a main crystal in the proportion shown in Table 8. Note that in each of Comparative Examples 3 and 4, a commercially available silica glass powder was used. The coefficient of thermal expansion was measured using a bulk sample having the same composition with a TMA.

Figure 2:
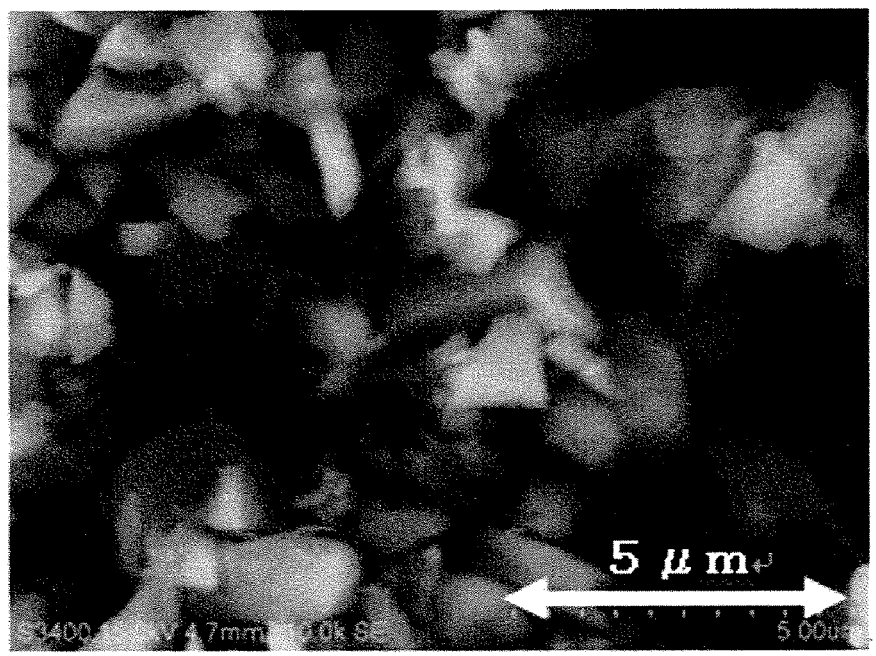
FIG. 2 is a photograph of a filler powder obtained in Comparative Example 2, as observed with a SEM.

The obtained filler powders were measured in terms of BET specific surface area. The results are shown in Table 9. Furthermore, photographs of the filler powders obtained in Example 3 and Comparative Example 2, as observed with a SEM, are shown in FIGS. 1 and 2, respectively.

(3) Production of Resin Formed Body

Each of the filler powders obtained as above was blended, into epoxy resin (the coefficient of thermal expansion in a temperature range of 30 to 150° C.: 1500×10⁻⁷/° C.), in a proportion of 50% by volume (the proportion of the filler powder relative to the total amount of the resin and the filler powder), thereby obtaining a resin composition. The viscosity of the resin composition was measured with a Brookfield viscometer under the conditions of a shear rate of 1 s$^{-1}$, a measurement temperature of 25° C., and a sensor type of SC4-14. The results are shown in Table 9.

A curing agent was added to the resin composition and the mixture was kneaded and then allowed to stand at 25° C. for 24 hours to be cured, thereby obtaining a resin formed body. The resin formed bodies were measured in terms of the coefficient of thermal expansion in a temperature range of 30 to 150° C. with a TMA. The results are shown in Table 9.

TABLE 8

|  |  | A | B | C |
|---|---|---|---|---|
| Glass Composition | $SiO_2$ | 66 | 66 | 100 |
| (% by mass) | $Al_2O_3$ | 22 | 23 |  |
|  | MgO |  | 1 |  |
|  | BaO | 1.5 | 1.5 |  |
|  | $Li_2O$ | 4 | 4 |  |
|  | $Na_2O$ | 0.5 | 0.5 |  |
|  | $K_2O$ | 0.5 |  |  |
|  | $TiO_2$ | 2 | 2 |  |
|  | $ZrO_2$ | 2 | 2 |  |
|  | $P_2O_5$ | 1.3 |  |  |
|  | $SnO_2$ | 0.2 |  |  |
| Crystallinity [% by mass] |  | 80 | 80 | 0 |
| CTE [×10$^{-7}$/° C.] |  | −11 | −1 | 5.7 | tive Example 1 or 2 was added exhibited a viscosity of as large as 2100 Pa·s or more, the resin compositions in which the filler powder of Example 1 or 3 was added exhibited a viscosity of as small as 750 Pa·s or less.

Whereas the resin compositions of Examples 1 to 4 had a coefficient of thermal expansion of 715 Pa·s or less, the resin compositions of Comparative Example 3 and 4 in which the filler powder made of silica glass was used had a coefficient of thermal expansion of as large as 770 Pa·s or more.

The invention claimed is:

1. A filler powder comprising:
    a crystallized glass in which β-quartz solid solution and/or β-eucryptite is precipitated; wherein
    the crystallized glass contains, in % by mass, 55 to 75% $SiO_2$, 15 to 30% $Al_2O_3$, 2 to 6% $Li_2O$, 0.1 to 3% $Na_2O$, 0.1 to 3% $K_2O$, 0 to 5% MgO, 0 to 10% ZnO, 0.1 to 5% BaO, 2 to 5% $TiO_2$, 0 to 4% $ZrO_2$, 0.1 to 5% $P_2O_5$, and 0.1 to 2.5% $SnO_2$.

2. The filler powder according to claim 1, having an average particle size $D_{50}$ of 5 μm or less.

3. The filler powder according to claim 1, having a coefficient of thermal expansion of 5×10$^{-7}$/° C. or less in a range of 30 to 150° C.

4. The filler powder according to claim 1, wherein the crystallized glass contains, in % by mass, 60 to 67% $SiO_2$, 17 to 27% $Al_2O_3$, 2 to 5% $Li_2O$, 0.1 to 1% $Na_2O$, 0.1 to 1% $K_2O$, 0 to 1% MgO, 0 to 3% ZnO, 0.1 to 3% BaO, 2 to 4% $TiO_2$, 0.1 to 3% $ZrO_2$, 0.1 to 4% $P_2O_5$, and 0.1 to 1.4% $SnO_2$.

TABLE 9

|  |  | Examples | | | | Comparative Examples | | | |
|---|---|---|---|---|---|---|---|---|---|
|  |  | 1 | 2 | 3 | 4 | 1 | 2 | 3 | 4 |
| Filler Powder | Glass Composition | A | B | A | A | A | A | C | C |
|  | Grinding Method | Dry grinding Wet grinding 1 Wet grinding 2 | Dry grinding Wet grinding 1 Wet grinding 2 | Dry grinding Wet grinding 1 | Dry grinding | Dry grinding Wet grinding 1 Wet grinding 2 | Dry grinding Wet grinding 1 | — | — |
|  | Particle Diameter $D_{50}$ [μm] | 0.7 | 0.7 | 2 | 25 | 0.7 | 2 | 0.7 | 2.8 |
|  | $D_{99}$ | 1.6 | 1.6 | 5.3 | 100 | 1.6 | 5.3 | 1.9 | 4 |
|  | Rate of Temperature Rise [° C./min] | 50 | 50 | 50 | 50 | 20 | 20 | — | — |
|  | Shape | approx. spherical | approx. spherical | approx. spherical | polyhedral | crushed | crushed | approx. spherical | approx. spherical |
|  | Specific Surface Area [m$^2$/g] | 6 | 6 | 3 | 0.3 | 10 | 5 | — | — |
| Resin Formed Body | Viscosity [Pa · s] | 750 | — | 90 | — | 2100 | 2880 | — | — |
|  | CTE [×10$^{-7}$/° C.] | 690 | 715 | 710 | 700 | 690 | 710 | 780 | 770 |

(4) Discussion of Results

The filler powders of Examples 1 to 3 had an approximately spherical shape and the filler powder of Example 4 had a polyhedral shape (in which the corners and edges were rounded). On the other hand, the filler powders of Comparative Examples 1 and 2 had a crushed shape. The filler powders of Examples 1 and 2 and Comparative Example 1 had equal particle diameters. However, whereas the filler powder of Comparative Example 1 had a specific surface area of 10 m$^2$/g, the filler powders of Examples 1 and 2 had a specific surface area of as small as 6 m$^2$/g. Furthermore, the filler powders of Example 3 and Comparative Example 2 had equal particle diameters. However, whereas the filler powder of Comparative Example 2 had a specific surface area of 5 m$^2$/g, the filler powder of Example 3 had a specific surface area of as small as 3 m$^2$/g. Therefore, whereas the resin compositions in which the filler powder of Compara- 5. The filler powder according to claim 1, having an approximately spherical shape or an approximately columnar shape.

6. The filler powder according to claim 1, being used to be blended into a resin.

7. A resin composition containing the filler powder according to claim 1 and a resin.

8. A method for manufacturing a filler powder, the method comprising the step of:
    heating a crystallizable glass powder at a crystallization onset temperature or higher to precipitate β-quartz solid solution and/or β-eucryptite, wherein
    a rate of temperature rise from below the crystallization onset temperature to the crystallization onset temperature or higher is not less than 25° C/min, and
    the filler powder contains, in % by mass, 55 to 75% $SiO_2$, 15 to 30% $Al_2O_3$, 2 to 6% $Li_2O$, 0.1 to 3% $Na_2O$, 0.1 to 3% $K_2O$, 0 to 5% MgO, 0 to 10% ZnO, 0.1 to 5% BaO, 2 to 5% $TiO_2$, 0 to 4% $ZrO_2$, 0.1 to 5% $P_2O_5$ and 0.1 to 2.5% $SnO_2$.

9. The method for manufacturing a filler powder according to claim 8, further comprising the steps of:
holding the crystallizable glass powder below the crystallization onset temperature for a predetermined period of time to form crystal nuclei, and then
heating the crystallizable glass powder to the crystallization onset temperature or higher.

10. The method for manufacturing a filler powder according to claim 8, further comprising the step of holding the crystallizable glass powder at the crystallization onset temperature or higher for a predetermined period of time to grow crystals.

11. The method for manufacturing a filler powder according to claim 8, wherein the filler powder has an average particle size $D_{50}$ of 5 μm or less.

12. The method for manufacturing a filler powder according to claim 8, wherein the filler powder has a specific surface area of 20 $m^2$/g or less.

13. The method for manufacturing a filler powder according to claim 8, wherein the filler powder has an approximately spherical shape.

14. The method for manufacturing a filler powder according to claim 8, wherein the filler powder has a coefficient of thermal expansion of $5\times10^{-7}$/° C. or less in a range of 30 to 150° C.

* * * * *